(12) United States Patent
Huang et al.

(10) Patent No.: US 7,696,726 B2
(45) Date of Patent: Apr. 13, 2010

(54) BATTERY CHARGER AND ASSOCIATED METHOD

(75) Inventors: Chun-Sheng Huang, Yunlin (TW); Hann-Wen Lin, Hsinchu (TW)

(73) Assignee: Broadcom Corporation, Irvine, CA (US)

( * ) Notice: Subject to any disclaimer, the term of this patent is extended or adjusted under 35 U.S.C. 154(b) by 612 days.

(21) Appl. No.: 11/546,380

(22) Filed: Oct. 12, 2006

(65) Prior Publication Data

US 2008/0007213 A1  Jan. 10, 2008

Related U.S. Application Data

(60) Provisional application No. 60/817,083, filed on Jun. 29, 2006.

(51) Int. Cl.
*H02J 7/04* (2006.01)
*H02J 7/00* (2006.01)

(52) U.S. Cl. .................. 320/139; 320/128; 320/137

(58) Field of Classification Search .............. 320/106, 320/107, 110, 111, 112, 113, 114, 115, 16, 320/117, 120, 121, 122, 123, 128, 138, 139, 320/149, DIG. 19, DIG. 21, 137, 148
See application file for complete search history.

(56) References Cited

U.S. PATENT DOCUMENTS

| | | | | |
|---|---|---|---|---|
| 4,885,522 A | * | 12/1989 | Konopka | 320/145 |
| 5,325,040 A | * | 6/1994 | Bogut et al. | 320/150 |
| 5,565,756 A | * | 10/1996 | Urbish et al. | 320/103 |
| 5,596,567 A | * | 1/1997 | deMuro et al. | 320/106 |
| 6,008,620 A | * | 12/1999 | Nagano et al. | 320/106 |
| 6,288,522 B1 | * | 9/2001 | Odaohhara et al. | 320/138 |
| 6,489,750 B2 | * | 12/2002 | Hebding et al. | 320/139 |
| 7,199,558 B2 | * | 4/2007 | Solie et al. | 320/137 |

* cited by examiner

*Primary Examiner*—Edward Tso
*Assistant Examiner*—M'Baye Diao
(74) *Attorney, Agent, or Firm*—Sterne, Kessler, Goldstein & Fox P.L.L.C.

(57) ABSTRACT

The present invention relates to battery chargers. A first controller can be configured to set, when a first power supply is coupled to a first port, a current produced by a variable current source at a safe rate to charge a battery. An ammeter can be configured to measure, when the battery is coupled to a second port, the current flowing into the battery. The first controller can be configured to increase, after a passing of a quantifiable amount of time, the current produced by the variable current source by a quantifiable amount of current. The first controller can be configured to continue iteratively to increase, after the passing of the quantifiable amount of time, the current produced by the variable current source by the quantifiable amount of current until the safe rate is near or at a highest safe rate to charge the battery.

23 Claims, 8 Drawing Sheets

BATTERY CHARGER AND ASSOCIATED METHOD

CROSS-REFERENCE TO RELATED APPLICATIONS

This application claims the benefit of U.S. Provisional Application No. 60/817,083, filed Jun. 29, 2006, which is incorporated herein in its entirety by reference.

BACKGROUND OF THE INVENTION

1. Field of the Invention

The present invention relates to battery chargers.

2. Related Art

Portable electric and electronic products are powered by batteries. Increasingly, such products are being designed to use specially configured batteries rather than standard batteries. Because these specially configured batteries can be relatively expensive, typically they are recharged rather than replaced. Because these specially configured batteries often remain coupled to their corresponding products while being charged, which can preclude use of these products during the charging process, there is a desire to complete the charging process in a reasonably short period of time.

However, charging a battery too quickly can damage it. Therefore, battery chargers usually divide the charging process into a constant current procedure and a constant voltage procedure. A constant current procedure is performed during the earlier portion of the charging process and prevents the battery from being charged by current at a damaging rate. A constant voltage procedure is performed during the later portion of the charging process and allows the battery to be charged to its rated voltage.

Circuits designed to implement constant current procedures have been closed loop circuits. Usually, such circuits include capacitors to maintain stability. This increases the amount of power such circuits consume and the area that they occupy. What is needed is a battery charger circuit that implements a constant current procedure, but consumes relatively little power and occupies a relatively small area.

BRIEF SUMMARY OF THE INVENTION

The present invention relates to battery chargers. An embodiment of the battery charger comprises a first port, a second port, a variable current source, an ammeter, and a first controller. The first port is configured to be coupled to a first power supply. The second port is configured to be coupled to a battery. The variable current source is coupled between the first port and the second port. The ammeter is coupled between the variable current source and the second port. The first controller is coupled to the ammeter and configured to control a current produced by the variable current source.

The first controller can be configured to set, when the first power supply is coupled to the first port, the current produced by the variable current source at a safe rate to charge the battery. The ammeter can be configured to measure, when the battery is coupled to the second port, the current flowing into the battery. The first controller can be configured to increase, after a passing of a quantifiable amount of time, the current produced by the variable current source by a quantifiable amount of current. The first controller can be configured to continue iteratively to increase, after the passing of the quantifiable amount of time, the current produced by the variable current source by the quantifiable amount of current until the safe rate is near or at a highest safe rate to charge the battery.

Another embodiment of the battery charger comprises a first port, a second port, a first transistor, a second transistor, a third transistor, a fourth transistor, a fifth transistor, a first resistor, a second resistor, a third resistor, a first operational amplifier, a differential amplifier, and a controller. The first port is configured to be coupled to a first power supply. The second port is configured to be coupled to a battery. The first transistor is coupled between the first port and the second port. The first resistor is coupled between the first port and a control terminal of the first transistor. The second transistor is coupled between the control terminal of the first transistor and a ground. The third transistor is coupled to the second transistor to form a first current mirror. The fourth transistor is coupled between a third port and the third transistor. The third port is configured to be coupled to a second power supply. The fifth transistor is coupled to the fourth transistor to form a second current mirror. The second resistor is coupled to the fifth transistor at a node. The second resistor has a variable resistance. The first operational amplifier is configured to compare a voltage at the node with a first reference voltage and to produce a voltage at a control terminal of the fifth transistor. The third resistor is coupled between the first transistor and the second port. The differential amplifier is configured to compare a voltage drop across the third resistor with a second reference voltage and to produce a first control signal. The controller is configured to receive the first control signal and to control the variable resistance.

The present invention also relates to a method for charging a battery. A current is provided at a safe rate to charge the battery. The current is measured. After a passing of a quantifiable amount of time, the current is increased by a quantifiable amount. The measuring and the increasing can be repeated until the safe rate is near or at a highest safe rate to charge the battery. A substantially constant voltage can be provided to charge the battery when a voltage of the battery is equal to or greater than a reference voltage.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The present invention is now described with reference to the figures where like reference numbers indicate identical or functionally similar elements. Also in the figures, the left most digit(s) of each reference number identifies the figure in which the reference number is first used.

DETAILED DESCRIPTION OF THE INVENTION

Figure 1:
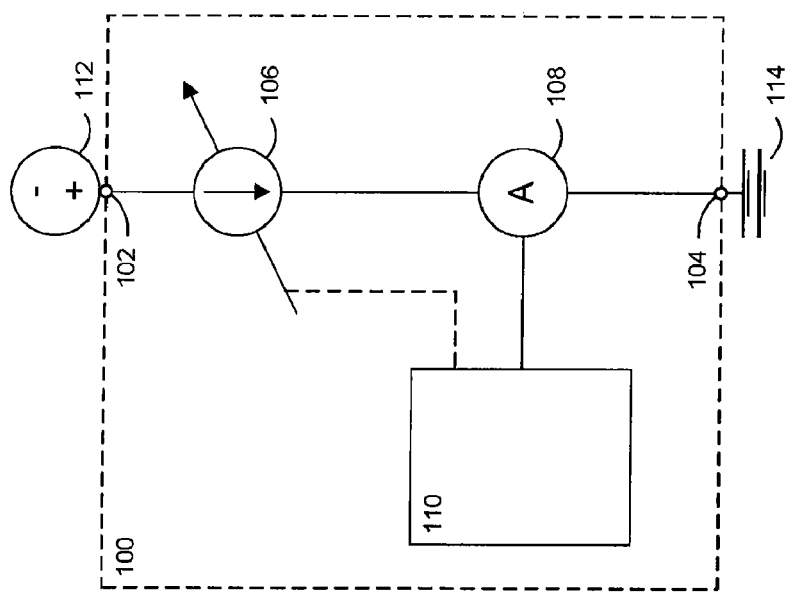
FIG. 1 is a schematic diagram of an embodiment 100 of a battery charger.

The present invention relates to battery chargers. FIG. 1 is a schematic diagram of an embodiment 100 of a battery charger. Embodiment 100 comprises a first port 102, a second port 104, a variable current source 106, an ammeter 108, and a first controller 110. First port 102 is configured to be coupled to a first power supply 112. Second port 104 is configured to be coupled to a battery 114. Variable current source 106 is coupled between first port 102 and second port 104. Ammeter 108 is coupled between variable current source 106 and second port 104. First controller 110 is coupled to ammeter 108 and configured to control a current produced by variable current source 106.

For example, first controller 112 can be configured to set, when first power supply 112 is coupled to first port 102, the current produced by variable current source 106 at a safe rate to charge battery 114. Ammeter 108 can be configured to measure, when battery 114 is coupled to second port 104, the current flowing into battery 114. First controller 110 can be configured to increase, after a passing of a quantifiable amount of time, the current produced by variable current source 106 by a quantifiable amount of current. First controller 110 can be configured to continue iteratively to increase, after the passing of the quantifiable amount of time, the current produced by variable current source 106 by the quantifiable amount of current until the safe rate is near or at a highest safe rate to charge battery 114.

Figure 2:
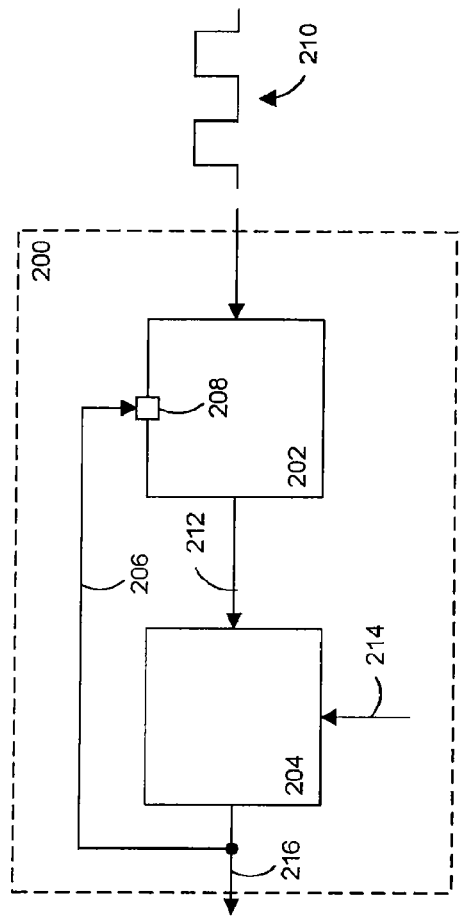
FIG. 2 is a schematic diagram of an embodiment 200 of a portion of first controller 110 that determines the quantifiable amount of time.

FIG. 2 is a schematic diagram of an embodiment 200 of a portion of first controller 110 that determines the quantifiable amount of time. Embodiment 200 comprises a counter 202, a comparator 204, and an interconnect 206. Counter 202 has a reset port 208 and is configured to receive a clock signal 210 and to produce a sum signal 212. Comparator 204 is configured to receive sum signal 212, to compare sum signal 212 to a specific integer 214, and to produce a control signal 216. Interconnect 206 is configured to convey control signal 216 to reset port 208. Clock signal 210 has a periodic waveform. Sum signal 212 represents a sum. The sum is equal to a number of waveforms of clock signal 210 received by counter 202 after counter 202 has been reset. For example, if specific integer 214 is three, then control signal 216 is set to a high value in response to counter 202 having received the third waveform of clock signal 210 after counter 202 has been reset. Control signal 216 is set to a low value in response to counter 202 having received other than the third waveform of clock signal 210 after counter 202 has been reset. The quantifiable amount of time is equal to a product of specific integer 214 multiplied by a period of the periodic waveform of clock signal 210.

The skilled artisan recognizes alternative embodiments for the portion of first controller 110 that determines the quantifiable amount of time. Accordingly, the present invention is not limited to the configuration of the portion of first controller 110 that determines the quantifiable amount of time as depicted at FIG. 2.

Figure 3:
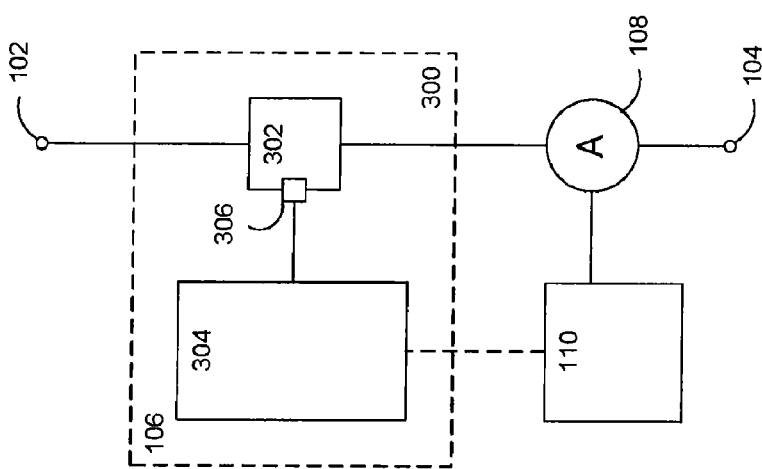
FIG. 3 is a schematic diagram of an embodiment 300 of variable current source 106.

FIG. 3 is a schematic diagram of an embodiment 300 of variable current source 106. Embodiment 300 comprises a first transistor 302 and a variable biasing network 304. First transistor 302 is coupled between first port 102 and second port 104. Variable biasing network 304 is coupled to a control terminal 306 of first transistor 302. First transistor 302 can be, but is not limited to, a bipolar junction transistor (more specifically, a pnp bipolar transistor). Thus, control terminal 306 of first transistor 302 can be a base of a bipolar junction transistor, a gate of a field effect transistor, etc. Preferably, first transistor 302 can support a relatively high current while consuming relatively little power. In embodiment 300, first controller 110 can be configured to control biasing of variable biasing network 304.

The skilled artisan recognizes alternative embodiments for variable current source 106. Accordingly, the present invention is not limited to the configuration of variable current source 106 as depicted at FIG. 3.

Figure 4:
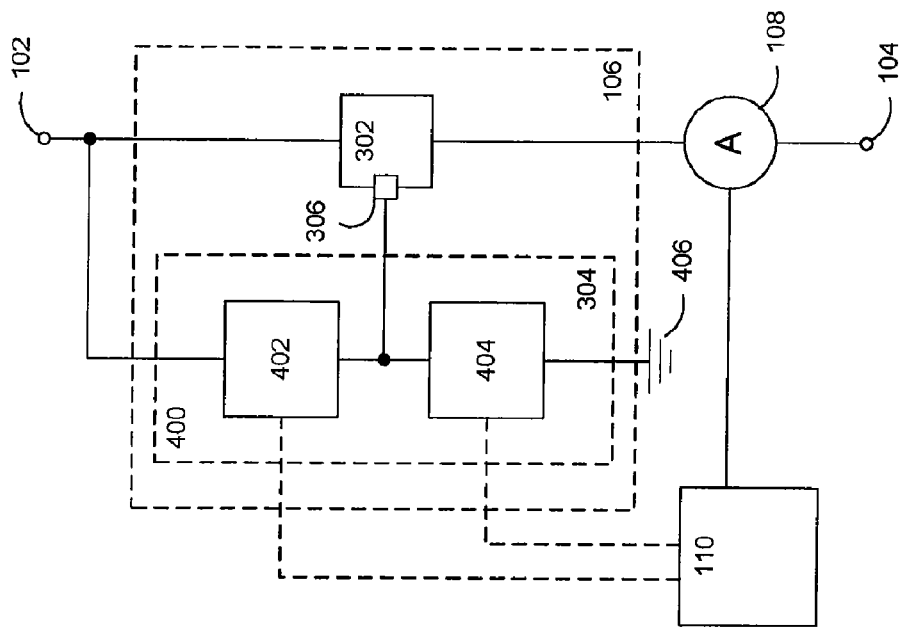
FIG. 4 is a schematic diagram of an embodiment 400 of variable biasing network 204.

FIG. 4 is a schematic diagram of an embodiment 400 of variable biasing network 304. Embodiment 400 comprises a first device 402 and a second device 404. First device 402 is coupled between first port 102 and control terminal 306 of first transistor 302. First device 402 has a first resistance. Second device 404 is coupled between control terminal 306 of first transistor 302 and a ground 406. Second device 404 has a second resistance. The first resistance, the second resistance, or both are variable. In embodiment 400, first controller 110 can be configured to control the first resistance, the second resistance, or both.

Figure 5:
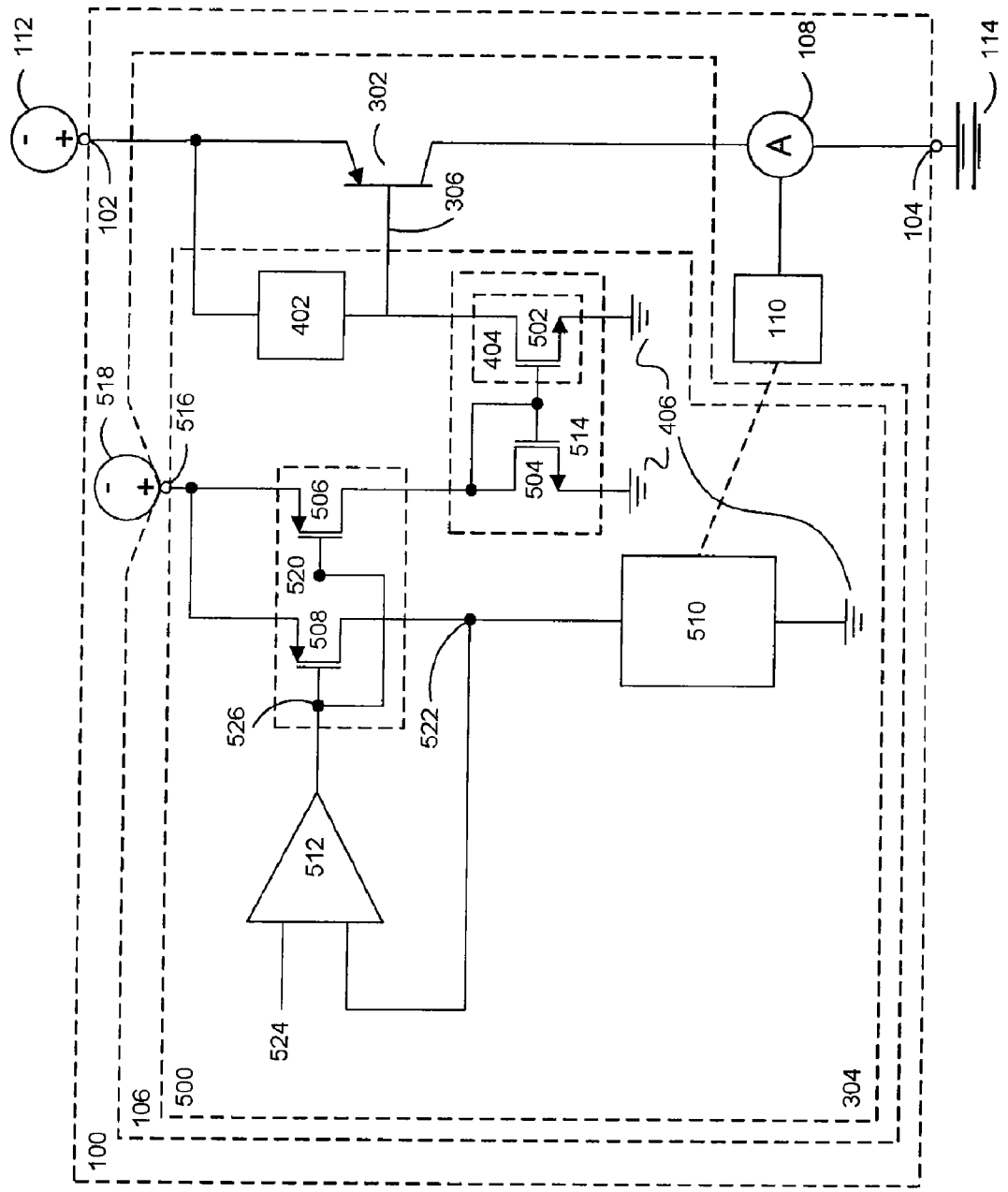
FIG. 5 is a schematic diagram of an embodiment 500 of variable biasing network 204.

FIG. 5 is a schematic diagram of an embodiment 500 of variable biasing network 304. Embodiment 500 incorporates a version of embodiment 400 in which second device 404 is a second transistor 502. Second transistor 502 can be, for example, an n-channel field effect transistor. Embodiment 500 further comprises a third transistor 504, a fourth transistor 506, a fifth transistor 508, a third device 510, and an operational amplifier 512. Third transistor 504 is coupled to second transistor 502 to form a first current mirror 514. Third transistor 504 can be, for example, an n-channel field effect transistor. Fourth transistor 506 is coupled between a third port 516 and third transistor 504. Fourth transistor 506 can be, for example, a p-channel field effect transistor. Third port 516 is configured to couple to a second power supply 518. Fifth transistor 508 is coupled to fourth transistor 506 to form a second current mirror 520. Fifth transistor 508 can be, for example, a p-channel field effect transistor. Third device 510 is coupled to fifth transistor 508 at a node 522. Third device 510 has a third resistance. The third resistance is variable. Operational amplifier 512 is configured to compare a voltage at node 522 with a reference voltage 524 and to produce a voltage at a control terminal 526 of fifth transistor 508.

In embodiment 500, first controller 110 can be configured to control the third resistance. For example, when first power supply 112 is coupled to first port 102 and second power supply 518 is coupled to third port 516, first controller 110 sets the third resistance to a relatively large value. Operational amplifier 512 acts so that the voltage produced at control terminal 526 of fifth transistor 508 causes the voltage at node 522 to be substantially equal to reference voltage 524. This causes a relatively small amount of current to flow through third device 510. Because third device 510 is coupled in series with fifth transistor 508, the same current that flows through third device 510 also flows through fifth transistor 508. Because fifth transistor 508 and fourth transistor 506 form second current mirror 520, the same relatively small amount of current flows through each of fifth transistor 508 and fourth transistor 506. Because fourth transistor 506 is coupled in series with third transistor 504, the same current that flows through fourth transistor 506 also flows through third transistor 504. Because third transistor 504 and second transistor 502 form first current mirror 514, the same relatively small amount of current flows through each of third transistor 504 and second transistor 502.

The current flowing out of control terminal 306 of first transistor 302 is equal to the difference of the current flowing through first device 402 subtracted from the current flowing through second transistor 502. Because a relatively small amount of current flows through second transistor 502, a relatively small amount of current also flows out of control terminal 306 of first transistor 302 so that the current produced by first transistor 302 is set at a safe rate to charge battery 114.

Explained another way (i.e., if first transistor 302 is a p-channel field effect transistor), the voltage at control terminal 306 of first transistor 302 is equal to the difference of the voltage drop across first device 402 subtracted from first power supply 112. The voltage drop across first device 402 is equal to the product of the first resistance multiplied by the current flowing through first device 402. Because first device 402 is coupled in series with second transistor 502, the same current that flows through third device 510 also flows through second transistor 502. Therefore, a relatively small amount of current flows through both first device 402 and second transistor 502 so that the voltage at control terminal 306 of first transistor 302 is relatively high and the current produced by first transistor 302 is set at a safe rate to charge battery 114.

Advantageously, by providing stability via operational amplifier 512 rather than a capacitor, embodiment 500 consumes relatively little power. Furthermore, in an embodiment, all elements but first transistor 302 can be formed on a chip and configured to occupy a relatively small area. Second power supply 518 can be an on-chip power supply while first power supply 112 can be external to the chip.

The skilled artisan recognizes alternative embodiments for variable biasing network 304. Accordingly, the present invention is not limited to the configurations of variable biasing network 304 as depicted at FIGS. 4 and 5.

Figure 6:
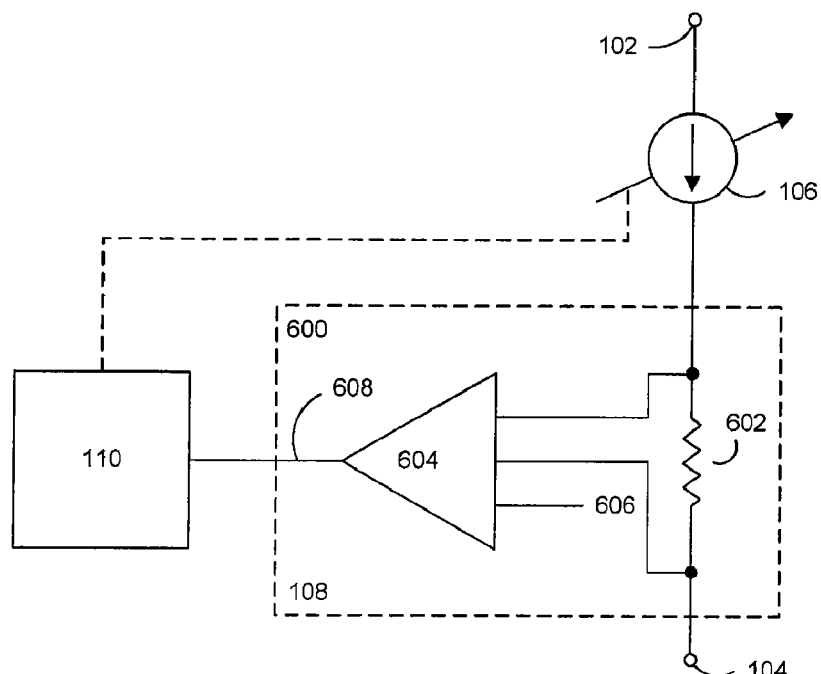
FIG. 6 is a schematic diagram of an embodiment 600 of ammeter 108.

FIG. 6 is a schematic diagram of an embodiment 600 of ammeter 108. Embodiment 600 comprises a resistor 602 and a differential amplifier 604. Resistor 602 is coupled between variable current source 106 and second port 104. Differential amplifier 604 is configured to compare a voltage drop across resistor 602 with a reference voltage 606 and to produce a control signal 608. In embodiment 600, first controller 110 can be configured to receive control signal 608. In embodiment 600, first controller 110 can be configured to increase the current produced by variable current source 106 until the voltage drop across resistor 602 is equal to or greater than reference voltage 606.

The skilled artisan recognizes alternative embodiments for ammeter 108. Accordingly, the present invention is not limited to the configuration of ammeter 108 as depicted at FIG. 6.

Figure 7:
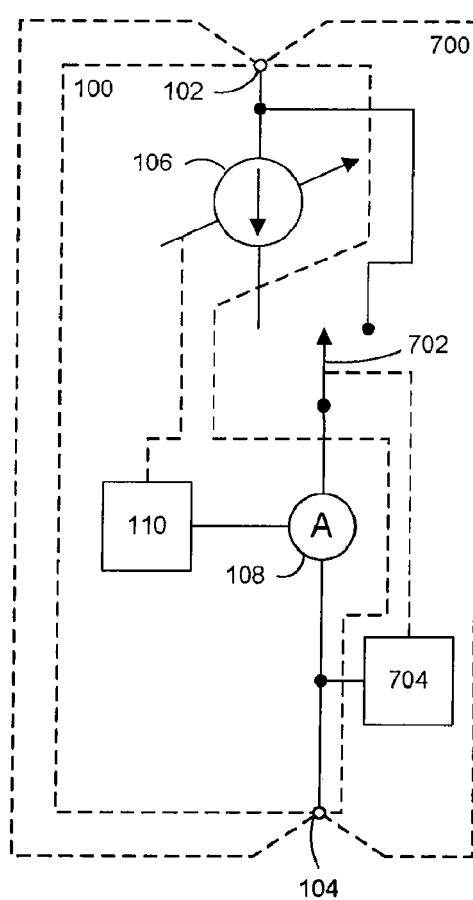
FIG. 7 is a schematic diagram of an embodiment 700 of a battery charger.

FIG. 7 is a schematic diagram of an embodiment 700 of a battery charger. Embodiment 700 incorporates embodiment 100 and further comprises a switch 702 and a second controller 704. Switch 702 is configured to cause second port 104 to have a substantially constant voltage. Second controller 704 is coupled to second port 104 and configured to control switch 702. Switch 702 can be, but is not limited to, a transistor (more specifically, a p-channel field effect transistor).

Figure 8:
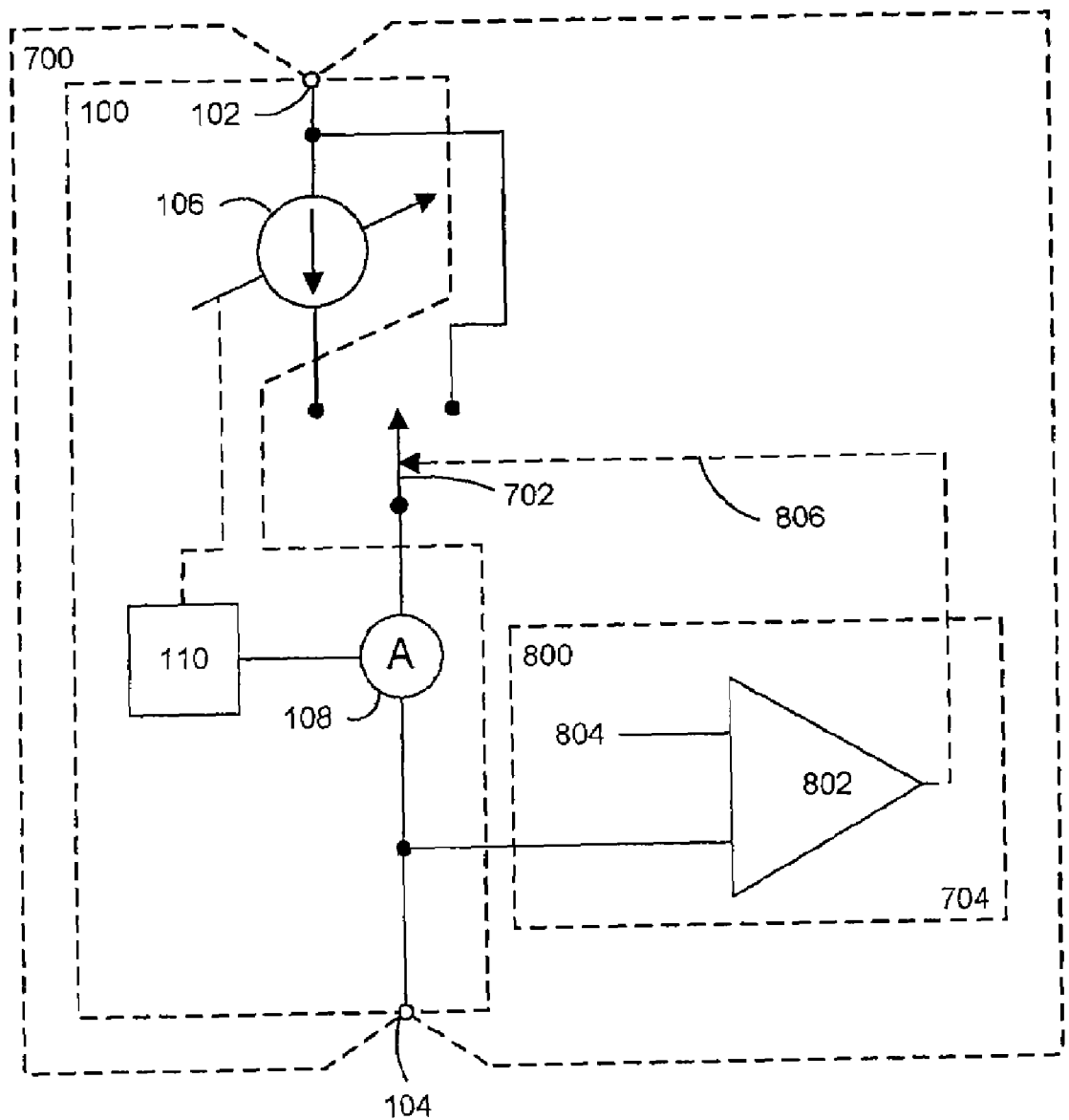
FIG. 8 is a schematic diagram of an embodiment 800 of second controller 704.

FIG. 8 is a schematic diagram of an embodiment 800 of second controller 704. Embodiment 800 comprises an operational amplifier 802. Operational amplifier 802 is configured to compare a voltage at second port 104 with a reference voltage 804 and to produce a control signal 806. In embodiment 800, control signal 806 can be configured to cause second port 104 to have the substantially constant voltage after the voltage at second port 104 is equal to or greater than reference voltage 804.

The skilled artisan recognizes alternative embodiments for second controller 704. Accordingly, the present invention is not limited to the configuration of second controller 704 as depicted at FIG. 8.

Furthermore, the skilled artisan recognizes that the battery charger of the present invention can incorporate various combinations of the embodiments presented above and their equivalents.

Figure 9:
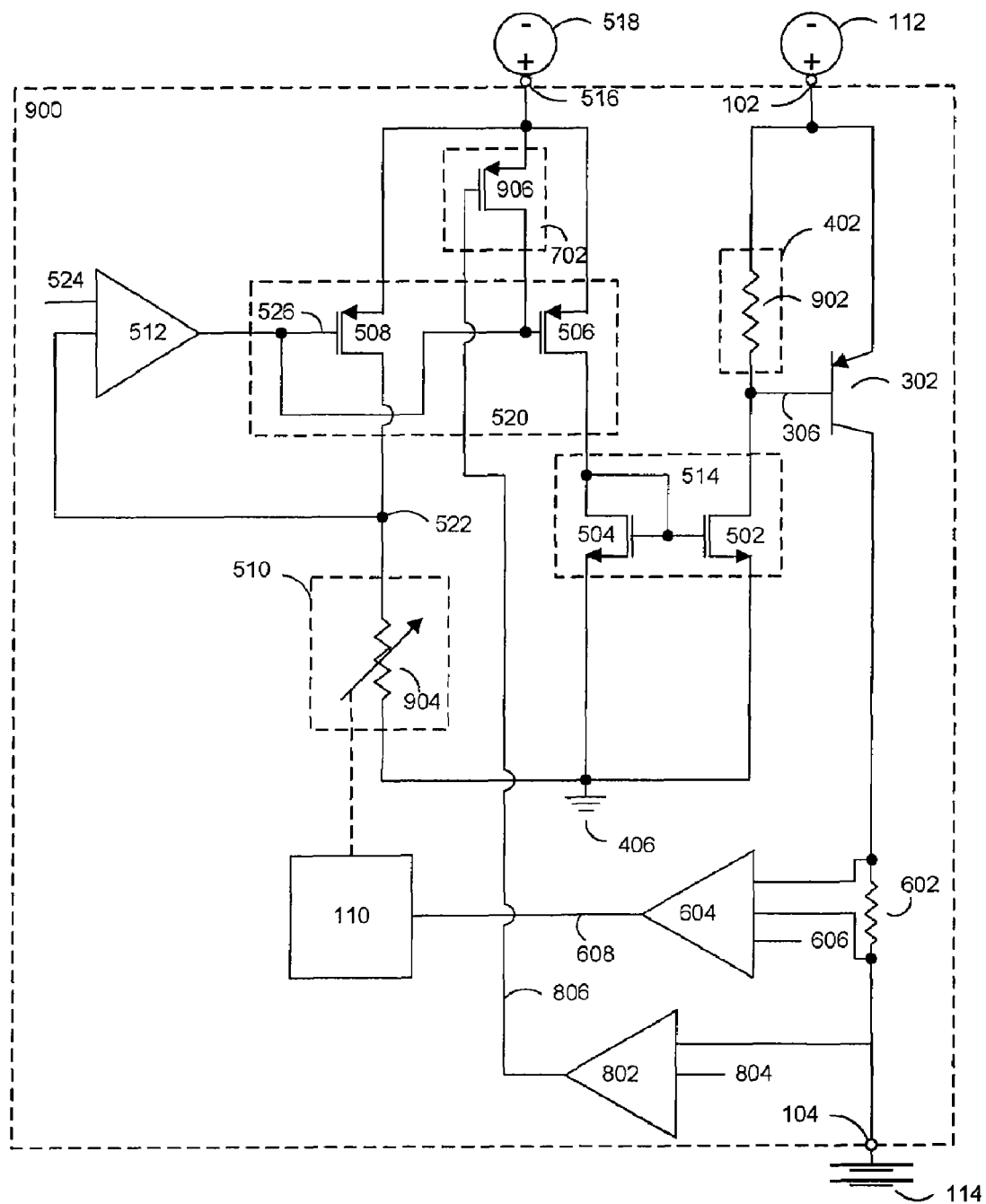
FIG. 9 is a schematic diagram of an embodiment 900 of a battery charger.

For example, FIG. 9 is a schematic diagram of an embodiment 900 of a battery charger. Embodiment 900 comprises first port 102, second port 104, first transistor 302, first device 402, second transistor 502, third transistor 504, fourth transistor 506, a fifth transistor 508, third device 510, operational amplifier 512, resistor 602, differential amplifier 604, and first controller 110.

First port 102 is configured to be coupled to first power supply 112. Second port 104 is configured to be coupled to battery 114. First transistor 302 is coupled between first port 102 and second port 104. First transistor 302 can be, but is not limited to, a bipolar junction transistor (more specifically, a pnp bipolar transistor). Thus, control terminal 306 of first transistor 302 can be the base of a bipolar junction transistor, the gate of a field effect transistor, etc. Preferably, first transistor 302 can support a relatively high current while consuming relatively little power.

First device 402 is coupled between first port 104 and control terminal 306 of first transistor 302. First device 402 has a first resistance. First device 402 can be a first resistor 902. Second transistor 502 is coupled between control terminal 306 of first transistor 302 and ground 406. Second transistor 502 can be, for example, an n-channel field effect transistor. Third transistor 504 is coupled to second transistor 502 to form first current mirror 514. Third transistor 504 can be, for example, an n-channel field effect transistor. Fourth transistor 506 is coupled between third port 516 and third transistor 504. Fourth transistor 506 can be, for example, an p-channel field effect transistor. Third port 516 is configured to couple to second power supply 518. Fifth transistor 508 is coupled to fourth transistor 506 to form second current mirror 520. Fifth transistor 508 can be, for example, an p-channel field effect transistor. Third device 510 is coupled to fifth transistor 508 at node 522. Third device 510 has a third resistance, which is variable. Third device 510 can be a second resistor 904. Operational amplifier 512 is configured to compare the voltage at node 522 with reference voltage 524 and to produce a voltage at control terminal 526 of fifth transistor 508.

Resistor 602 is coupled between first transistor 302 and second port 104. Differential amplifier 604 is configured to compare a voltage drop across resistor 602 with reference voltage 606 and to produce control signal 608.

First controller 110 is configured to receive control signal 608 and to control the third resistance. For example, first controller 110 can be configured to set, when first power supply 112 is coupled to first port 102 and second power supply 518 is coupled to third port 516, the third resistance so that a current produced by first transistor 302 is at a safe rate to charge battery 114. Resistor 602 and differential amplifier 604 can be configured to measure, when battery 114 is coupled to second port 104, the current flowing into battery 114. First controller 110 can be configured to decrease, after a passing of a quantifiable amount of time, the third resistance so that the current produced by first transistor 302 increases by a quantifiable amount of current. First controller 110 can be configured to continue iteratively to decrease, after the passing of the quantifiable amount of time, the third resistance so that the current produced by first transistor 302 increases by the quantifiable amount of current until the voltage drop across resistor 602 is equal to or greater than reference voltage 606.

Figure 10:
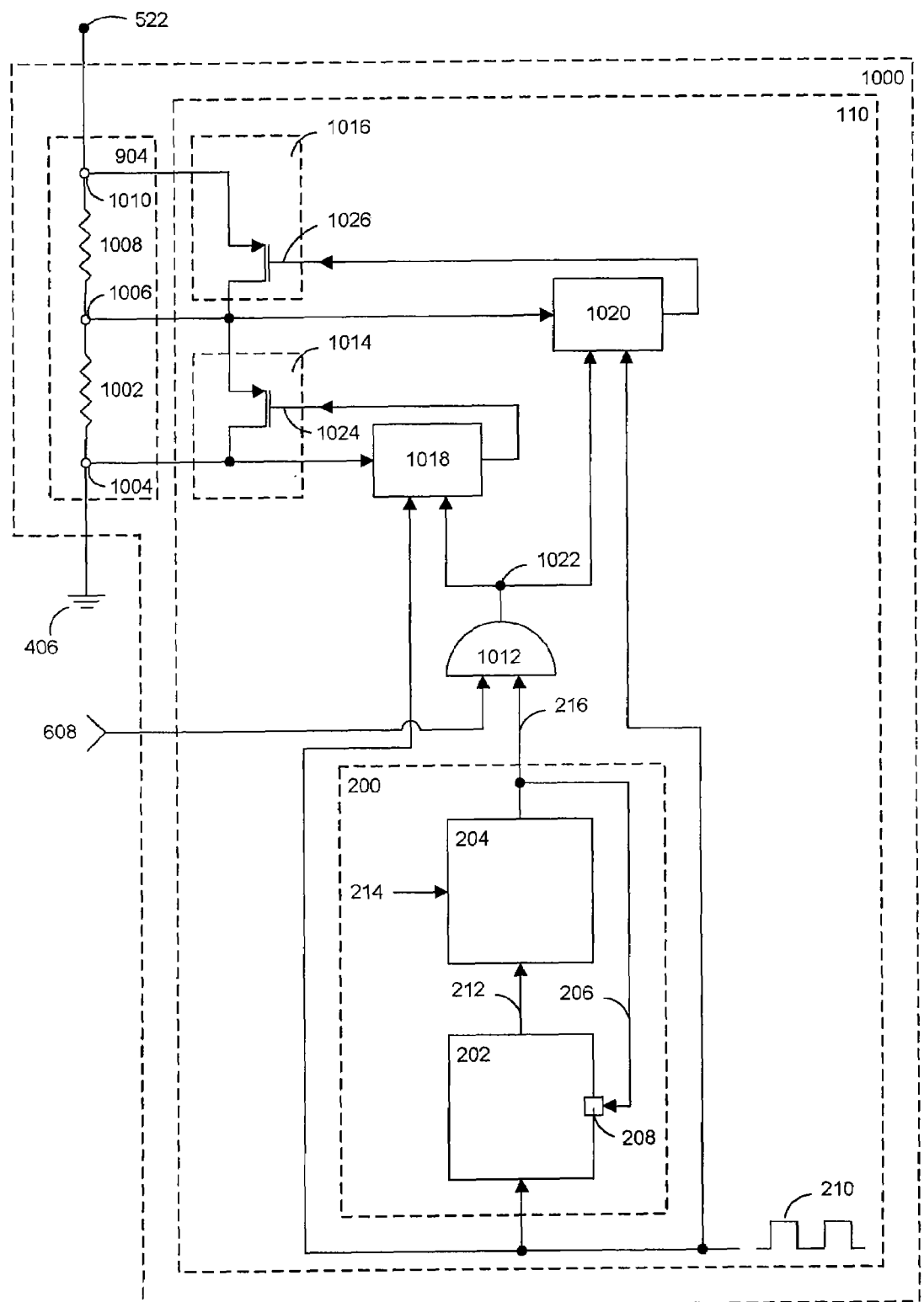
FIG. 10 is a schematic diagram of an embodiment 1000 of second resistor 904 and first controller 110.

FIG. 10 is a schematic diagram of an embodiment 1000 of second resistor 904 and first controller 110. In embodiment 1000, second resistor 904 comprises a fourth resistor 1002 coupled between a first tap 1004 and a second tap 1006 and a fifth resistor 1008 coupled between second tap 1006 and a third tap 1010. Second tap 1006 can be, but is not necessarily, positioned so that the resistance of fourth resistor 1002 is equal to the resistance of fifth resistor 1008. In embodiment 1000, first controller 110 incorporates embodiment 200 and further comprises an AND gate 1012, a first switch 1014, a second switch 1016, a first delay flip-flop 1018, and a second delay flip-flop 1020.

AND gate 1012 is configured to receive control signal 608 and control signal 216 and to produce a third control signal 1022. First switch 1014 is coupled between first tap 1004 and second tap 1006. First switch 1014 can be, but is not limited to, a transistor (more specifically, a p-channel field effect transistor). Second switch 1016 is coupled between second tap 1006 and third tap 1010. Second switch 1016 can be, but is not limited to, a transistor (more specifically, a p-channel field effect transistor). First delay flip-flop 1018 is coupled to first tap 1004 and configured to be activated by third control signal 1022, to receive clock signal 210, and to control first switch 1014. Second delay flip-flop 1020 is coupled to second tap 1006 and configured to be activated by third control signal 1022, to receive clock signal 210, and to control second switch 1016. First delay flip-flop 1018, second delay flip-flop 1020, and counter 202 can be configured to change state in response to either a rising edge of clock signal 210 or a falling edge of clock signal 210. If first delay flip-flop 1018 and second delay flip-flop 1020 are configured to change state in response to the rising edge of clock signal 210, then counter 202 is configured to change state in response to the falling edge of clock signal 210, and vice versa.

For example, first controller 110 can be configured to open, when first power supply 112 (see FIG. 9) is coupled to first port 102 (see FIG. 9) and second power supply 518 (see FIG. 9) is coupled to third port 516 (see FIG. 9), first switch 1014 and second switch 1016 so that the current produced by first transistor 302 (see FIG. 9) is at a safe rate to charge battery 114 (see FIG. 9). The voltage at first tap 1004 is equal to ground 406, which will be recognized by first delay flip-flop 1018 as the low value. The voltage at second tap 1006 is not equal to either ground 406 or second power supply 518 (see FIG. 9). Therefore, second delay flip-flop 1020 will not recognize a value at second tap 1006.

Resistor 602 (see FIG. 9) and differential amplifier 604 (see FIG. 9) can be configured to measure, when battery 114 (see FIG. 9) is coupled to second port 104 (see FIG. 9), the current flowing into battery 114 (see FIG. 9). If the voltage drop across resistor 602 (see FIG. 9) is less than reference voltage 606 (see FIG. 9), then control signal 608 is set to the high value. After the passing of the quantifiable amount of time (i.e., the product of specific integer 214 multiplied by the period of the periodic waveform of clock signal 210), control signal 216 is set to the high value by comparator 204 at the rising (falling) edge of clock signal 210. AND gate 1012 receives control signal 608 at the high value and control signal 216 at the high value and produces third control signal 1022 at the high level, which activates both first delay flip-flop 1018 and second delay flip-flop 1020. The low value at first tap 1004 is conveyed to a control terminal 1024 of first switch 1014 (p-channel field effect transistor) by first delay flip-flop 1018 at the falling (rising) edge of clock signal 210 so that first switch 1014 closes, which decreases the third resistance.

Having control signal 216 set at the high value also resets counter 202 so that control signal 216 is set to the low value with the next rising (falling) edge of clock signal 210, which sets third control signal 1022 to the low level, which deactivates both first delay flip-flop 1018 and second delay flip-flop 1020. However, with first switch 1014 closed, the voltage at first tap 1004 and the voltage at second tap 1006 are equal to ground 406, which will be recognized by each of first delay flip-flop 1018 and second delay flip-flop 1020 as the low value.

If the voltage drop across resistor 602 (see FIG. 9) is still less than reference voltage 606 (see FIG. 9), then control signal 608 remains set to the high value. After the passing of the quantifiable amount of time (i.e., the product of specific integer 214 multiplied by the period of the periodic waveform of clock signal 210), control signal 216 is again set to the high value by comparator 204 at the rising (falling) edge of clock signal 210. AND gate 1012 receives control signal 608 at the high value and control signal 216 at the high value and again produces third control signal 1022 at the high level, which activates both first delay flip-flop 1018 and second delay flip-flop 1020. The low value at first tap 1004 is conveyed to control terminal 1024 of first switch 1014 (p-channel field effect transistor) by first delay flip-flop 1018 at the falling (rising) edge of clock signal 210 so that first switch 1014 remains closed. The low value at second tap 1006 is conveyed to a control terminal 1026 of second switch 1016 (p-channel field effect transistor) by second delay flip-flop 1020 at the falling (rising) edge of clock signal 210 so that second switch 1016 closes, which decreases the third resistance.

On the other hand, if the voltage drop across resistor 602 (see FIG. 9) is equal to or greater than reference voltage 606 (see FIG. 9), then control signal 608 is set to the low value. After the passing of the quantifiable amount of time (i.e., the product of specific integer 214 multiplied by the period of the periodic waveform of clock signal 210), control signal 216 is again set to the high value by comparator 204 at the rising (falling) edge of clock signal 210. AND gate 1012 receives control signal 608 at the low value and control signal 216 at the high value and produces third control signal 1022 at the low level, which precludes activation of both first delay flip-flop 1018 and second delay flip-flop 1020. First switch 1014 remains closed and second switch 1016 remains opened, which holds the third resistance at its previous setting.

The skilled artisan recognizes alternative embodiments for second resistor 904 and first controller 110. Accordingly, the present invention is not limited to the configurations of second resistor 904 and first controller 110 as depicted at FIG. 10.

Returning to FIG. 9, embodiment 900 can further comprise switch 702 and operational amplifier 802. Switch 702 is configured to control fourth transistor 506. Switch 702 can be, but is not limited to, a sixth transistor 906 (more specifically, a p-channel field effect transistor). Operational amplifier 802 is configured to compare the voltage at second port 104 with reference voltage 804 and to produce control signal 806 to control switch 702. Control signal 806 can be configured to cause switch 702 to close when the voltage at second port 104 is equal to or greater than reference voltage 804 so that fourth transistor 506 is configured to cause second port 104 to have a substantially constant voltage.

For example, when the voltage at second port 104 is equal to or greater than reference voltage 804, control signal 806 is set to the high value by operational amplifier 802, which causes fifth transistor 906 (p-channel field effect transistor) to close, which causes fourth transistor 506 (p-channel field effect transistor) to operate in saturation. Because fourth transistor 506 is coupled in series with third transistor 504 (n-channel field effect transistor), the same current that flows through fourth transistor 506 also flows through third transistor 504. Because third transistor 504 and second transistor 502 (n-channel field effect transistor) form first current mirror 514, the same relatively large amount of current flows through each of third transistor 504 and second transistor 502.

The current flowing out of control terminal 306 of first transistor 302 (pnp bipolar junction transistor) is equal to the difference of the current flowing through first resistor 902 subtracted from the current flowing through second transistor 502. Because a relatively large amount of current flows through second transistor 502, a relatively large amount of current also flows out of control terminal 306 of first transistor 302 so that first transistor 302 operates in saturation to cause second port 104 to have a substantially constant voltage.

When the voltage at second port 104 is less than reference voltage 804, control signal 806 is set to the low value by operational amplifier 802, which causes fifth transistor 906 (p-channel field effect transistor) to open, which causes fourth transistor 506 (p-channel field effect transistor) to operate as described above with reference to FIG. 5.

Figure 11:
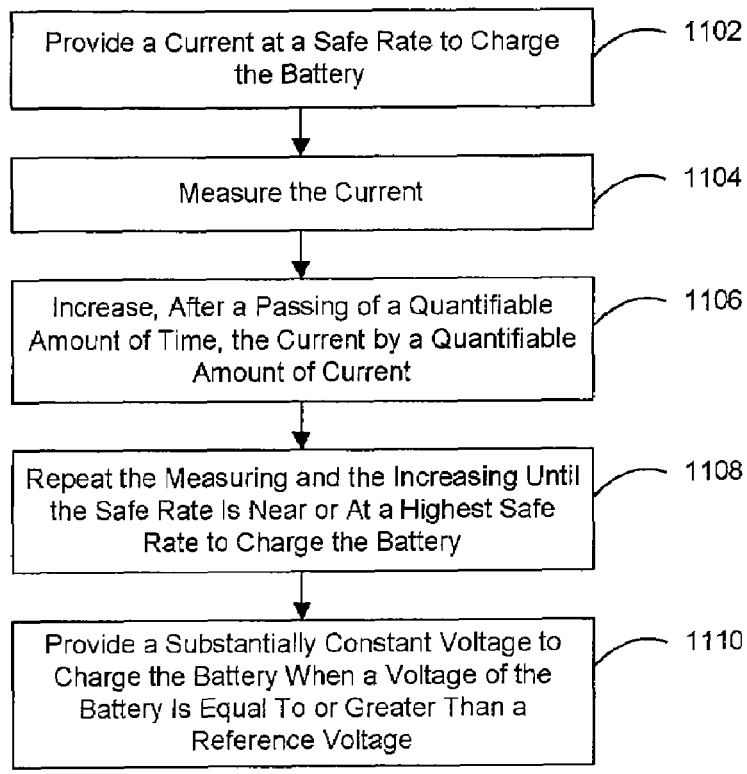
FIG. 11 is a flow chart of a method 1100 for charging a battery.

The present invention also relates to a method for charging a battery. FIG. 11 is a flow chart of a method 1100 for charging a battery. In method 1100, at a step 1102, a current is provided at a safe rate to charge the battery. For example, a first controller of a battery charger can be configured to set a current produced by a variable current source of the battery charger at a safe rate to charge the battery. At a step 1104, the current is measured. For example, an ammeter of the batter charger can measure the current. At a step 1106, after a passing of a quantifiable amount of time, the current is increased by a quantifiable amount of current. For example, the first controller of the battery charger can be configured to increase, after the passing of the quantifiable amount of time, the current by the quantifiable amount of current.

Figure 12:
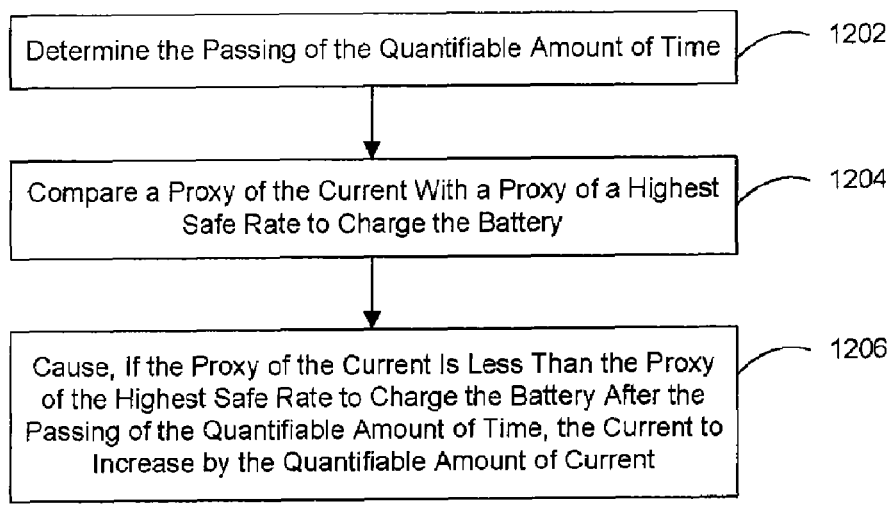
FIG. 12 is a flow chart of a method 1106 for increasing the current.

FIG. 12 is a flow chart of a method 1106 for increasing the current. In method 1106, at a step 1202, the passing of the quantifiable amount of time is determined. For example, a comparator of the battery charger can produce a first control signal indicative of the passing of the quantifiable amount of time when a counter of the battery charger has received a number of waveforms of a clock signal equal to a specific integer. At a step 1204, a proxy of the current is compared with a proxy of a highest safe rate to charge the battery. For example, a differential amplifier of the battery charger can compare a voltage drop across a resistor of the battery charger through which the current flows with a reference voltage and produce a second control signal indicate of the comparison. At a step 1206, if the proxy of the current is less than the proxy of the highest safe rate to charge the battery after the passing of the quantifiable amount of time, the current is caused to increase by the quantifiable amount of current. For example, an AND gate of the battery charger can receive the first control signal and the second control signal and produce a third control signal that causes the first controller of the battery charger to increase the current by the quantifiable amount of current.

Returning to FIG. 11, optionally, at a step 1108, the measuring and the increasing is repeated until the safe rate is near or at a highest safe rate to charge the battery. For example, the first controller of the battery charger can be configured to repeat the measuring and the increasing until the safe rate is near or at a highest safe rate to charge the battery. Optionally, at a step 1110, a substantially constant voltage is provided to charge the battery when a voltage of the battery is equal to or greater than a reference voltage. For example, a second controller of the battery charger can be configured to control a switch of the battery charger to provide a substantially constant voltage to charge the battery when the voltage of the battery is equal to or greater than the reference voltage.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A battery charger, comprising:
   a first port configured to be coupled to a first power supply;
   a second port configured to be coupled to a battery;
   a variable current source coupled between the first port and the second port;
   an ammeter coupled between the variable current source and the second port; and
   a first controller coupled to the ammeter and configured to control, based on an output of the ammeter, a current produced by the variable current source,
   wherein the variable current source comprises:
     a first transistor coupled between the first port and the second port; and
     a variable biasing network coupled to a control terminal of the first transistor.

2. The battery charger of claim 1, wherein the first controller is configured to set, when the first power supply is coupled to the first port, the current produced by the variable current source at a rate to charge the battery without damaging the battery.

3. The battery charger of claim 2, wherein the ammeter is configured to measure, when the battery is coupled to the second port, the current flowing into the battery.

4. The battery charger of claim 3, wherein the first controller is configured to increase, after a passing of a quantifiable amount of time, the current produced by the variable current source by a quantifiable amount of current.

5. The battery charger of claim 4, wherein the first controller is configured to iteratively increase, after the passing of the quantifiable amount of time, the current produced by the variable current source by the quantifiable amount of current until the rate is one of near and at a highest rate to charge the battery without damaging the battery.

6. The battery charger of claim 4, wherein the first controller comprises:
   a counter having a reset port and configured to receive a clock signal and to produce a sum signal;
   a comparator configured to receive the sum signal, to compare the sum signal to a specific integer, and to produce a control signal; and
   an interconnect configured to convey the control signal to the reset port;
   wherein the clock signal has a periodic waveform, the sum signal represents a sum, the sum is equal to a number of waveforms of the clock signal received by the counter after the counter has been reset, and the quantifiable amount of time is equal to a product of the specific integer multiplied by a period of the periodic waveform.

7. The battery charger of claim 1, wherein the first transistor is a bipolar junction transistor.

8. The battery charger of claim 1, wherein the first controller is configured to control biasing of the variable biasing network.

9. The battery charger of claim 1, wherein the biasing network comprises:
a first device coupled between the first port and the control terminal of the first transistor, the first device having a first resistance; and
a second device coupled between the control terminal of the first transistor and a ground, the second device having a second resistance;
wherein at least one of the first resistance and the second resistance is variable.

10. The battery charger of claim 9, wherein the first controller is configured to control at least one of the first resistance and the second resistance.

11. The battery charger of claim 9, wherein the second device is a second transistor and the biasing network further comprises:
a third transistor coupled to the second transistor to form a first current mirror;
a fourth transistor coupled between a third port and the third transistor, wherein the third port is configured to couple to a second power supply;
a fifth transistor coupled to the fourth transistor to form a second current mirror;
a third device coupled to the fifth transistor at a node, the third device having a third resistance, wherein the third resistance is variable; and
an operational amplifier configured to compare a voltage at the node with a reference voltage and to produce a voltage at a control terminal of the fifth transistor.

12. The battery charger of claim 11, wherein the first controller is configured to control the third resistance.

13. The battery charger of claim 1, wherein the ammeter comprises:
a resistor coupled between the variable current source and the second port; and
a differential amplifier configured to compare a voltage drop across the resistor with a reference voltage and to produce a control signal.

14. The battery charger of claim 13, wherein the first controller is configured to receive the control signal.

15. The battery charger of claim 13, wherein the first controller is configured to increase the current produced by the variable current source until the voltage drop across the resistor is one of equal to and greater than the reference voltage.

16. The battery charger of claim 1, further comprising:
a switch configured to cause the second port to have a substantially constant voltage; and
a second controller coupled to the second port and configured to control the switch.

17. The battery charger of claim 16, wherein the switch is a transistor.

18. The battery charger of claim 16, wherein the second controller comprises an operational amplifier configured to compare a voltage at the second port with a reference voltage and to produce a control signal.

19. The battery charger of claim 18, wherein the control signal is configured to cause the second port to have the substantially constant voltage after the voltage at the second port is one of equal to and greater than the reference voltage.

20. A method for charging a battery, comprising:
providing a current at a rate to charge the battery without damaging the battery;
measuring the current, between a variable current source and the battery, to provide feedback to a variable biasing network that varies conductivity of a transistor which controls the current; and
increasing, after a passing of a quantifiable amount of time, the current by a quantifiable amount of current.

21. The method of claim 20, wherein said increasing comprises:
determining the passing of the quantifiable amount of time;
comparing a proxy of the current with a proxy of a highest rate to charge the battery without damaging the battery; and
causing, if the proxy of the current is less than the proxy of the highest rate to charge the battery after the passing of the quantifiable amount of time, the current to increase by the quantifiable amount of current.

22. The method of claim 20, further comprising:
repeating the measuring and the increasing until the rate is one of near and at a highest rate to charge the battery without damaging the battery.

23. The method of claim 20, further comprising:
providing a substantially constant voltage to charge the battery when a voltage of the battery is one of equal to and greater than a reference voltage.

* * * * *